Patented May 11, 1954

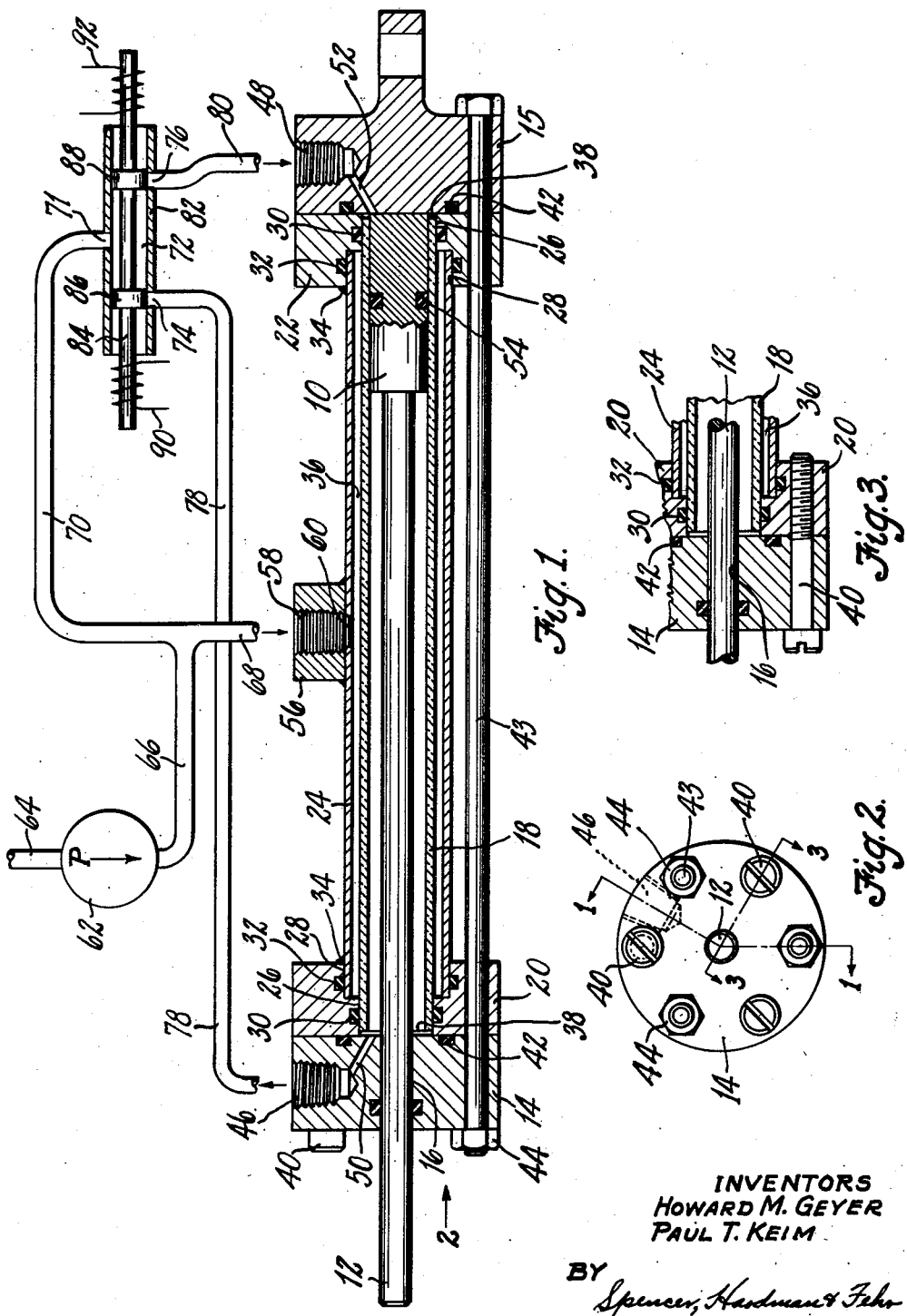

2,678,247

UNITED STATES PATENT OFFICE 2,678,247

LONG-STROKE FLUID SERVO

Howard M. Geyer and Paul T. Keim, Dayton, Ohio, assignors to General Motors Corporation, Detroit, Mich., a corporation of Delaware Application April 23, 1949, Serial No. 89,172

1 Claim. (Cl. 309—3)

This invention relates to fluid pressure actuators of the piston and cylinder type used in relatively long stroke applications.

A main object of the invention therefor is to provide piston and cylinder fluid servos of long stroke and small diameter of a type that can be easily fabricated at a minimum of cost and expenditure of time.

Constructions of the general character, have heretofore been very expensive to build, and offered many limitations that were inconsistent with the demands of the art. Thus, by prior art principles long stroke piston and cylinder actuators have their limitations that depend upon the ability to grind a near perfect cylindrical bore, as the interior passage, of a steel cylinder.

The present invention overcomes those limitations by providing an inner cylinder whose interior surface is accurately dimensioned uniformly thruout its length to maintain the same characteristics for piston engagement from end to end. This can be accomplished by use of a glass cylinder made from accurately sized glass tubing. The term "sized glass tubing" refers generally to tubing of uniform bore fabricated by one of the several methods of forming glass tubing with an accurate and uniform through passage. Various types and grades of glass may be used for the structure of the tubing itself, and its sizing may be effected by the use of a cylindrical mandrel carefully ground and honed to the required dimension. The assembly of glass tube and mandrel within it are then subjected to the sizing operation, somewhat like annealing, which will render the surrounding glass tube perfect and uniform in size and shape thruout its entire length. The coefficients of expansion of the glass and the mandrel make it possible to withdraw the mandrel from the sized glass tubing at a point when there will be no resultant sag or flow of unsupported glass to disturb the sized dimension. There is now available in the open market sized glass tubing that answers all requirements perfectly.

The servo unit is assembled by providing head members with sockets so spaced as to concentrically support the glass cylinder and a surrounding sheath or sleeve which is preferably made of steel tubing. Obviously, heavier, cast iron, or other available materials may be used for the surrounding sheath. In the final assembly the two cylinders are concentrically spaced to provide an annular chamber about the glass cylinder to which fluid pressure may be admitted, the head members supporting both cylinders providing suitable seals to prevent leakage and cross flow of fluid. The head members also provide fluid passages leading to the ends of the glass cylinder, by which fluid pressure may be applied to either side of the piston movable along the bore of the glass cylinder.

Glass tubing is recognized as being a relatively fragile material as compared with iron and steel and other metals. It has been found that it will sustain great fluid pressures subjected to its exterior in a crushing effect, which are far greater than internal pressures that it will withstand in a bursting effect. That is to say, far greater fluid pressure is necessary to crush a glass tube than is required to burst a glass tube. While a glass tube has low impact strength it may be adequately protected, as well as the bursting effect eliminated, by enclosing it in a second cylinder so that, fluid under pressure may be applied to the exterior of the glass cylinder at the same instant, and at equal potential, that fluid pressure is applied to either end of the bore of the glass tube in moving its piston. When fluid pressure is applied to either end of the piston, that portion of the glass cylinder surrounding the expanding chamber is subjected to equal fluid pressures both interior and exterior of the glass cylinder. There is however no bursting force experienced by the glass cylinder, since any bursting pressure in the expanding chamber is opposed by an equal compressing pressure surrounding the glass cylinder. The result is, the exterior and interior pressures on the glass cylinder merely tend to compact the particles of glass making up the wall of the cylinder along that extent of the expanding chamber. Of course the compressing pressure extends throughout the entire length of the glass cylinder, but is insufficient within the limits of normal fluid pressures of operation, to even distort the glass cylinder surrounding the contacting portion of the cylinder, and thus offer no hindrance to the free movement of the piston within the cylinder when pressure is being applied to expanding chamber.

While glass has been specified as a suitable material for a sized cylinder, cylinders of other brittle or frangible material may be used, and may include several of the plastics that are now available on the open market. The most important requirements of these materials for the inner cylinder is that the material be inexpensive, that it have such rigidity as to be self supporting within the range of normal operating conditions, that it have a great resistance to compressibility or deformation when subjected to high external pressures and low internal pressures, and that it have characteristics making for easy sizing. The finish of the material used should also be hard and smooth so as to provide the best possible surface against which to seal fluid pressure.

Further objects and advantages of the present invention will be apparent from the following description, reference being had to the accompanying drawings wherein a preferred embodiment of the present invention is clearly shown.

In the drawings:

Fig. 1 is a longitudinal sectional view of a long stroke fluid servo according to the present invention, associated with a fluid pressure circuit for its control, the view being substantially that indicated by the line and arrows 1—1 of Fig. 2.

Fig. 2 is an end elevation of the servo unit substantially as indicated by the arrow 2 of Fig. 1.

Fig. 3 is a detail view in section, substantially as indicated by the line and arrows 3—3 of Fig. 2, illustrating the means for securing the head members together.

With particular reference to the drawings, 10 indicates a piston head provided with a stem 12 of considerable lineal extent passing thru a cylinder cap 14 along bore 16 to slidably engage within the bore of a glass cylinder 18 supported at opposite ends by ring members 20 and 22 which have stepped bores receiving the ends of glass cylinder 18 and the ends of a surrounding cylinder 24. Each ring member 20—22 is step-bored at 26 and 28, and is there provided with an undercut receptive of a rubber-like seal ring 30 and 32 respectively. Ends of the glass cylinder 18 extend into the smaller portion 26 of the step bore and will compress somewhat the seal ring 30 and prevent cross flow of fluid under pressure between the rings 20 and 22 and the ends of the cylinder 18. The ends of the cylinder 24 are sealed in like manner within the portion 28 of the step bore by the compressible ring 32. If preferred, the seal rings 32 may be dispensed with and the ends of the tube 24 be brazed to the rings 20 and 22 as indicated at 34. In any case a fluid tight seal 32 capable of withstanding very high pressure should be incorporated in the union of cylinder member 24 and ring members 20 and 22.

Due to the counterbores 26 and 28 receptive of the ends of the cylinders 18 and 24, there is an annular space 36 separating the two cylinder members in substantial concentricity, the end portions of this space being closed off by the radial portion of the ring, that is, the shoulder between the bore portions 26 and 28. Also, the glass cylinder 18 is supported by the smaller bore of the rings 20 and 22 and is designedly somewhat shorter, as indicated at 38 than the assembled length of the rings 20 and 22 and cylinder member 24. To provide cylinder heads, cap members 14 and 15 are clamped against the end surface of the rings 20—22 respectively by screw devices 40 so that a compressible seal ring 42 operates to prevent fluid flow from between the members 14 and 20 on the one hand, and from between the members 15 and 22 on the other hand. Fig. 3 shows the screw device 40 in its clamping function to complete the assembly of the cylinder head, and while as suggested in Fig. 2, three of these screw devices are used, it is apparent that a greater number may be used as is needed to maintain the clamped members secure against leakage. The cylinder head members may be retained in assembly with the cylinder members by means of tie rods 43 passing thru the cylinder head assembly and extending the length of the assembly of cylinders and heads to receive a holding nut 44. The cap members 14 and 15 are provided with threaded openings 46 and 48 receptive of pipeage or tubing connections for admission and drain of fluid under pressure thru passages 50—52 connecting the threaded openings 46—48 to opposite ends of the glass cylinder 18. The piston head 10, which is slidable within the glass cylinder, is sealed against leakage or cross flow of pressure by a seal ring 54. A boss or like element 56 has a threaded passage 58 that opens by 60 to the annular space 36 between the glass cylinder 18 and the surrounding cylinder 24.

With these provisions the long stroke actuator can be connected with a source of fluid pressure for operation in either direction. As shown there is a pump 62 provided with an intake 64 and an outlet 66 having one branch 68 connected with the supply ports 60 for the passage or space 36 between the cylinders 18 and 24, and having a branch 70 leading to a groove 72 of a distributor valve that has a pair of spaced ports 74 and 76 opening into tubes 78 and 80 connected with the ports 46 and 48 of the cylinder heads. The ports 71, 74 and 76 are provided by a sleeve 82 within which slides a valve stem 84 providing lands 86, 88 disposed on opposite sides of the groove 72, and so spaced that when at the central position, the lands 86 and 88 will cover ports 74 and 76 and thereby prevent fluid flow to either passage 78 or 80. Movement of the member 84 in either direction so as to connect one of the control ports 74—76 with source pressure at 71, may be accomplished electromagnetically as suggested by the indication of solenoid windings 90—92. If preferred, other means may be used for distribution of the fluid pressure from the port 71 to either side of the actuating piston 10, and for connecting its opposite side with drain.

With reference to the fluid circuit and its control it will be apparent that the annular space 36 between the cylinder members 18 and 24 is always subject to the full potential of the pressure output from the pump 62 such that the outside of the glass cylinder 18 is always subject to the pump or line pressure, while the distribution of piston actuating pressure within the glass cylinder is never more than can be maintained by the pressure source 62. Therefore, the bursting stress placed upon the glass cylinder in moving the piston 10 is in effect wholly equalized by the fluid pressure exterior of the glass cylinder. As an example, shifting of the valve 84 toward the right as seen in Fig. 1, applies the pressure at port 71 to the port 76 of the valve structure which pressure applied to the passages 80 and 52 against the right hand surface of piston 10 and operates to extend the piston to the left. At the same time the full force of the pressure from pump 62 is present in the annular space 36 surrounding the glass cylinder 18. As the high pressure is admitted to the interior of the glass cylinder the piston 10 moves thus increasing the inside surface of the glass cylinder that is exposed to the high pressure, but yet there is no bursting force applied to the glass cylinder, since it is subject to the same pressure within and without the cylinder 18. It has been found that tremendous pressure may be applied to the outside of a glass tube before it will break or shatter while on the other hand relatively low internal pressures may cause the glass tube to shatter or at least crack. However, when the glass cylinder is subjected to equal pressures within and without, such glass cylinders and cooperating piston may be subjected to relatively great pressure without experiencing any destructive effects upon the glass cylinder. The surrounding cylinder for protecting or hydraulically supporting the glass cylinder need not be carefully dimensioned since the spacing 36 allows for considerable eccentricity, deformity, dents, bulges or other irregular formations in the body of the cylinder 24 so long as those imperfections do not contact the glass cylinder and do not subject it to some undue strain, or interfere with the application of source pressure to all outside surfaces of the glass tube. Thus, a piston and cylinder unit constructed as hereindisclosed will stand more rough usage such as bangs, dents, and twistings of the outer shell and yet not interfere with the efficiency of the piston and cylinder within.

While the embodiment of the present invention as herein disclosed, constitutes a preferred form, it is to be understood that other forms might be adopted.

What is claimed is as follows:

A fluid pressure operated actuator, comprising in combination, a cylinder of frangible material, a lineally movable element disposed in said cylinder capable of fluid pressure actuation in either direction, a tubular member surrounding said cylinder and spaced a predetermined distance therefrom to form a chamber therebetween, head means supporting the cylinder and the tubular member at opposite ends thereof, said head means having sockets adapted to receive and support the ends of the cylinder and tubular member, the ends of the sockets adapted to receive the frangible cylinder being spaced apart a distance greater than the length of said frangible cylinder, means constituting a port in said tubular member for admitting fluid under pressure to said chamber, and retaining means operatively engaging said head means for drawing together and maintaining said cylinder, tubular member and head means in assembled relation, the construction and arrangement being such that no compressive stress is imposed on said cylinder by said retaining means in maintaining the several actuator components in assembled relation.

References Cited in the file of this patent

UNITED STATES PATENTS

| Number | Name | Date |
|---|---|---|
| 140,643 | Rathbone | July 8, 1873 |
| 1,019,507 | McCormick | Mar. 5, 1912 |
| 1,051,339 | Livingston | Jan. 21, 1913 |
| 1,078,444 | Kilburn | Nov. 11, 1913 |
| 1,088,491 | Waitz | Feb. 24, 1914 |
| 1,396,243 | Beloit | Nov. 8, 1921 |
| 1,597,249 | Riley | Aug. 24, 1926 |
| 1,827,246 | Lorenzen | Oct. 13, 1931 |
| 2,207,921 | Huxford | July 16, 1940 |
| 2,246,392 | Spreng et al. | June 17, 1941 |
| 2,246,535 | Playfair | June 24, 1941 |
| 2,390,425 | Crum | Dec. 4, 1945 |
| 2,492,006 | Raybould | Dec. 20, 1949 |
| 2,518,787 | Huhtala | Aug. 15, 1950 |